United States Patent
Wong et al.

(10) Patent No.: US 7,729,147 B1
(45) Date of Patent: Jun. 1, 2010

(54) INTEGRATED CIRCUIT DEVICE USING SUBSTRATE-ON-INSULATOR FOR DRIVING A LOAD AND METHOD FOR FABRICATING THE SAME

(76) Inventors: Henry Wong, 1270 Oakmead Pkwy., Suite 201, Sunnyvale, CA (US) 94085; Raymond Chow, 1270 Oakmead Pkwy., Suite 201, Sunnyvale, CA (US) 94085

( * ) Notice: Subject to any disclaimer, the term of this patent is extended or adjusted under 35 U.S.C. 154(b) by 281 days.

(21) Appl. No.: 11/900,765

(22) Filed: Sep. 13, 2007

(51) Int. Cl.
  *H02M 1/00* (2007.01)
  *H02M 7/00* (2006.01)
(52) U.S. Cl. .................. 363/147; 363/125
(58) Field of Classification Search ............ 363/81, 363/84, 125–127, 147; 315/185 R, 186, 315/209 R, 210
See application file for complete search history.

(56) References Cited

U.S. PATENT DOCUMENTS

| | | | |
|---|---|---|---|
| 4,276,592 A * | 6/1981 | Goldman et al. | 363/147 |
| 4,875,151 A * | 10/1989 | Ellsworth et al. | 363/127 |
| 5,619,404 A | 4/1997 | Zak | |
| 5,646,063 A | 7/1997 | Mehta et al. | |
| 5,917,779 A | 6/1999 | Ralson et al. | |
| 6,057,214 A | 5/2000 | Joyner | |
| 6,078,512 A * | 6/2000 | Bouvier | 363/127 |
| 6,214,657 B1 | 4/2001 | Lee | |
| 6,235,607 B1 | 5/2001 | Ibok | |
| 6,656,782 B2 | 12/2003 | Skotnicki et al. | |
| 6,659,352 B1 * | 12/2003 | Asada et al. | 235/492 |
| 6,670,675 B2 | 12/2003 | Ho et al. | |
| 6,787,872 B2 | 9/2004 | Kinzer et al. | |
| 2003/0025157 A1 | 2/2003 | Ho et al. | |
| 2005/0162100 A1 | 7/2005 | Romano et al. | |
| 2007/0069663 A1 | 3/2007 | Burdalski et al. | |
| 2008/0191632 A1 * | 8/2008 | Lee | 315/185 R |

* cited by examiner

*Primary Examiner*—Matthew V Nguyen
(74) *Attorney, Agent, or Firm*—Peter Ganjian

(57) ABSTRACT

A semiconductor circuit for driving a load, comprising a transformerless Alternative Current (AC) to Direct Current (DC) converter integrated circuit that includes a high voltage circuit fabricated on a substrate for converting a high voltage AC input signal to a first high voltage DC output signal. Further included is a second circuit fabricated on the same substrate for regulating a drive signal for driving a load using power from the first high voltage output signal, with the high voltage circuit and the second circuit fabricated on the substrate to form a single integrated circuit (IC) chip.

18 Claims, 13 Drawing Sheets

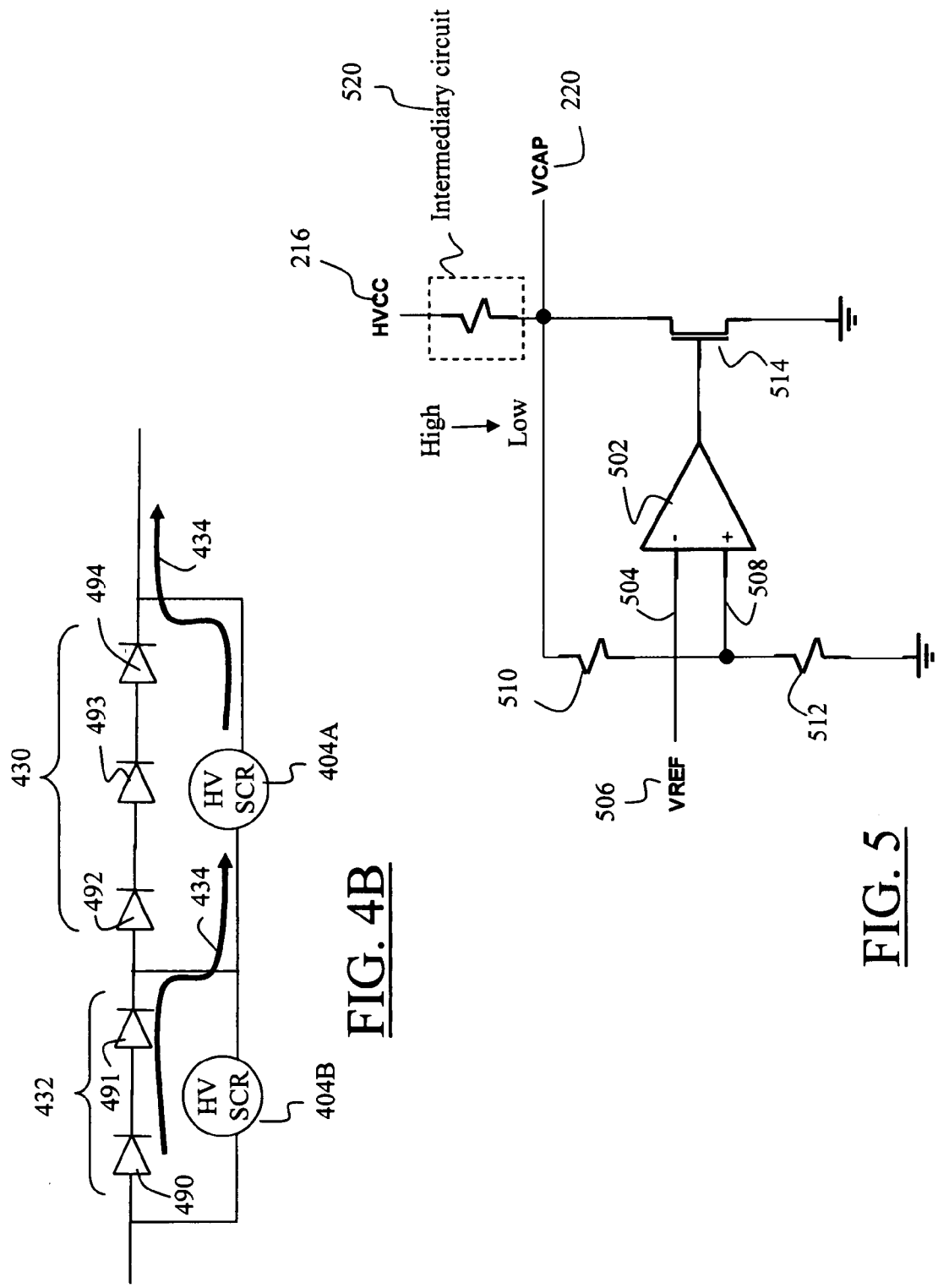

INTEGRATED CIRCUIT DEVICE USING SUBSTRATE-ON-INSULATOR FOR DRIVING A LOAD AND METHOD FOR FABRICATING THE SAME

BACKGROUND OF THE INVENTION (1) Field of the Invention

This invention relates generally to the field of semiconductor integrated circuit (IC) devices for driving a load and more particularly, to a semiconductor integrated circuit device with isolation structures to allow the application and processing of mixed signals to drive loads and a method for fabricating the same.

(2) Description of Related Art

Most Alternative Current (AC) to Direct Current (DC) converter circuits convert a high voltage AC input signal to a low voltage AC by using a transformer that steps down the incoming high voltage AC signal, and then convert the low voltage AC to low voltage DC using full-wave bridge rectifiers. Regrettably, most prior art AC to DC converters are bulky and in fact, may be larger than the loads to which they are connected due to the use of transformers. The use of transformers is one reason that conventional IC semiconductor manufacturing techniques cannot be used to integrate the converter circuits into a single IC chip to provide a compact and less bulky converter.

Another limiting factor with respect to conventional IC fabrication techniques and the end-product IC chip package is that converters are generally considered high voltage devices wherein high voltage (incoming AC) is processed and a low voltage (outgoing DC) signal is output. However, most IC chips operate on a single low signal power (e.g., 3.5 or 5 volts). The same IC chip would have to simultaneously process an incoming high voltage AC signal and convert it to a low DC signal, while at the same time use a low voltage signal (e.g., 3.5 or 5 volts) for its own operation and control, none of which is possible with conventional ICs and IC fabrication techniques.

Accordingly, in light of the current state of the art and the drawbacks to current AC to DC converters mentioned above, a need exists for a high voltage AC to low voltage DC converter for driving a load that would be fabricated on a single IC chip, that would reduce bulk, and that would operate efficiently without much generation and dissipation of heat.

BRIEF SUMMARY OF THE INVENTION

One aspect of the present invention provides a semiconductor circuit for driving a load, comprising a transformerless Alternative Current (AC) to Direct Current (DC) converter integrated circuit, including a high voltage circuit fabricated on a substrate for converting a high voltage AC input signal to a first high voltage DC output signal. Further included is a second circuit fabricated on the substrate for regulating a drive signal for driving a load using power from the first high voltage output signal, with the high voltage circuit and the second circuit are fabricated on the substrate forming a single integrated circuit (IC) chip.

One optional aspect of the present invention provides a semiconductor circuit for driving a load, wherein the substrate is comprised of a patterned substrate-on-insulator pattern, insulating the high voltage circuit from that of the second circuit, with both on the same substrate.

Another optional aspect of the present invention provides a semiconductor circuit for driving a load, wherein the high voltage circuit is comprised of a bridge rectifier and the second circuit is comprised of a regulator circuit.

Yet another optional aspect of the present invention provides a semiconductor circuit for driving a load, wherein the bridge rectifier is comprised of a high voltage bridge rectifier, including: one or more semiconductor rectifiers that are coupled in series, with one or more series coupled semiconductor rectifiers coupled in bridge circuit topography to provide a maximum reverse-bias potential that is greater than the high voltage Alternative Current (AC) input signal.

Still another optional aspect of the present invention provides a semiconductor circuit for driving a load, wherein the one or more semiconductor rectifiers are coupled in parallel with a semiconductor transistor switch enabling a bypassing of the one or more semiconductor rectifiers to save power.

A further optional aspect of the present invention provides a semiconductor circuit for driving a load, wherein the semiconductor transistor switch is a silicon controlled rectifier.

Still a further optional aspect of the present invention provides a semiconductor circuit for driving a load, wherein the first high voltage Direct Current (DC) output signal is coupled with at least one semiconductor rectifier, with another end of the at least one semiconductor rectifier coupled with ground, providing a trench bias.

Another optional aspect of the present invention provides a semiconductor circuit for driving a load, wherein the semiconductor rectifiers are comprised of semiconductor devices coupled to function as rectifiers.

Yet another optional aspect of the present invention provides a semiconductor circuit for driving a load, wherein the semiconductor rectifiers are comprised of diodes.

Still another optional aspect of the present invention provides a semiconductor circuit for driving a load, wherein a second circuit includes a linear regulator coupled with the first high voltage Direct Current (DC) output signal output from the high voltage circuit for providing a first low voltage signal for an externally coupled device, with the externally coupled device providing a second low voltage signal to the second circuit. Further included is a reference voltage module coupled with the linear regulator for providing a reference voltage from which the first low voltage signal is determined, and a current level control for activating a current regulator for a time. Additionally the current regulator outputs a predetermined amount of regulated output current within the time. In addition, included is a thermal protection for determining a temperature of the current regulator and shutting off the current regulator if the temperature exceeds a predetermined threshold level, and a power protection module for shutting off the current regular if regulated output current exceeds a predetermined threshold level.

A further optional aspect of the present invention provides a semiconductor circuit for driving a load, wherein the externally coupled device is a capacitor and is charged by the first low voltage signal.

Yet a further optional aspect of the present invention provides a semiconductor circuit for driving a load, wherein the linear regulator includes an operational amplifier with a first operational amplifier input coupled with the reference voltage, and a second operational amplifier input coupled with the first high voltage Direct Current (DC) output signal through a set of resistors, with the operational amplifier driving a shunt transistor for maintaining and providing the first low voltage signal to the externally coupled device.

Another optional aspect of the present invention provides a semiconductor circuit for driving a load, wherein the reference voltage is generated through bandgap reference of a transistor.

Still another optional aspect of the present invention provides a semiconductor circuit for driving a load, wherein the current level control is driven by a pulse width modulator (PWM), and outputs a drive signal that activates the current regulator for the time, which is commensurately determined by the duty cycle of the pulse width modulation, with the amount of regulated output current output by the current regulator within the time is determined by a predetermined input current set $I_{SET}$ and the voltage reference $V_{REF}$.

Yet another optional aspect of the present invention provides a semiconductor circuit for driving a load, wherein the thermal protection is provided by temperature-compensated bias reference.

Another optional aspect of the present invention provides a semiconductor circuit for driving a load, wherein the power protection module detects the amount of power by detecting the regulated output current output from the current regulator and the amount of voltage across the load.

A further optional aspect of the present invention provides a semiconductor circuit for driving a load, wherein the patterned substrate-on-insulator topography includes: an insulator layer for insulating a device substrate from a base substrate, with the insulator layer further including vertically oriented trenches, normal to the device substrate, separating and insulating the device substrate into isolated device substrate regions. Further, one or more isolated device substrate regions include the first high voltage circuit that is comprised of a bridge rectifier and the second circuit that is comprised of a regulator circuit.

Still a further optional aspect of the present invention provides a semiconductor circuit for driving a load, wherein each isolated device substrate region of the one or more isolated device substrate regions includes one or more semiconductor devices, with a plurality of isolated device substrate regions and the one or more semiconductor devices within each isolated device substrate region forming the single transformer-less AC to DC converter integrated circuit (IC) chip.

Another optional aspect of the present invention provides a semiconductor circuit for driving a load, wherein insulator layer is a buried oxide layer.

Yet another optional aspect of the present invention provides a semiconductor circuit for driving a load, wherein the load is comprised of one or more Light Emitter diodes.

Another aspect of the present invention provides a semiconductor device fabrication method, comprising providing a first substrate having a first surface; providing a second substrate, bonding the second substrate on the first surface of the first substrate using an insulator bonding layer, forming a single piece, bulk substrate with the second substrate and the insulator bonding layer forming a substrate-on-insulator region. Further, preparing a top surface of the second substrate; forming a trench region on the substrate-on-insulator region, separating the substrate-on-insulator region into separate, isolated active regions; filling a trench region with an insulator to insulate the separate, isolated active regions; and forming one or more individual semiconductor components within the separate, isolated active regions, isolating the one or more individual semiconductor components to form a substrate-on-insulator semiconductor device.

An optional aspect of the present invention provides a semiconductor device fabrication method, wherein the first substrate is a wafer handle, and the second substrate is the device wafer, with the device wafer forming a device substrate.

Another optional aspect of the present invention provides a semiconductor device fabrication method, wherein the first substrate includes a growth of insulator bonding layer.

Yet another optional aspect of the present invention provides a semiconductor device fabrication method, wherein the second substrate includes with a growth of insulator bonding layer on a bottom surface of the second substrate.

Still another optional aspect of the present invention provides a semiconductor device fabrication method, wherein bonding of the device substrate on the base substrate top surface, includes pressing the device substrate to the base substrate together.

A further optional aspect of the present invention provides a semiconductor device fabrication method, wherein the insulator layer used to bond the device substrate with the base substrate is comprised of an Oxide layer.

Still a further optional aspect of the present invention provides a semiconductor device fabrication method, wherein the preparing the top surface of the second substrate includes girding and polishing.

Another optional aspect of the present invention provides a semiconductor device fabrication method, wherein the trench regions are formed by removing portions of the substrate-on-insulator region, forming vertically oriented trenches.

Yet another optional aspect of the present invention provides a semiconductor device fabrication method, wherein the removing of portions of the substrate-on-insulator to form trenches, includes masking certain areas of the substrate-on-insulator region to form the isolated active regions, and etching a remaining areas of the substrate-on-insulator region to form the trenches.

Still another optional aspect of the present invention provides a semiconductor device fabrication method, wherein filling the trench regions with insulator, includes: growing an oxide layer within an inner surfaces of the trench regions, and filling the trench regions with poly-silicon.

A further optional aspect of the present invention provides a semiconductor device fabrication method, wherein the width of the trench region is approximately 1 to 2 micrometers.

Still a further optional aspect of the present invention provides a semiconductor device fabrication method, wherein the trench region is comprised of a trench topography that includes: one or more external trench regions and one or more internal trench regions, with the external and internal trench regions biased for maintaining a substantially equal potential difference between adjacent trenches to prevent a break down of the trench regions (silicon breakdown).

Another optional aspect of the present invention provides a semiconductor device fabrication method, wherein the one or more individual semiconductor components within the separate, isolated active regions are coupled by a conductor that crosses over the trench regions to form the semiconductor device, with one or more individual semiconductor components forming a first high voltage circuit that is comprised of a bridge rectifier and forming a second circuit that is comprised of a regulator circuit, and with the first high voltage circuit and the second circuit coupled with intermediary circuit by the conductor, with the intermediary circuit lowering a high voltage input from the first high voltage circuit and coupling a lower voltage to the second circuit.

Yet another optional aspect of the present invention provides a semiconductor device fabrication method, wherein the bridge rectifier is comprised of a high voltage bridge rectifier, including: one or more semiconductor rectifiers that are coupled in series, with one or more series coupled semiconductor rectifiers coupled in bridge circuit topography to provide a maximum reverse-bias potential greater than the first high voltage Alternative Current (AC) input signal.

A further optional aspect of the present invention provides a semiconductor device fabrication method, wherein the one or more semiconductor rectifiers are coupled in parallel with a semiconductor transistor switch enabling a bypassing of the one or more semiconductor rectifiers to save power.

Still a further optional aspect of the present invention provides a semiconductor device fabrication method, wherein a first high voltage Direct Current (DC) output signal is coupled with at least one semiconductor rectifier, with another end of the at least one semiconductor rectifier coupled with ground, providing a trench bias.

Another optional aspect of the present invention provides a semiconductor device fabrication method, wherein the intermediary circuit is comprised of an electrical component that has an impedance, and is formed within an isolated active region of the substrate-on-insulator.

Yet another optional aspect of the present invention provides a semiconductor device fabrication method, wherein the electrical component is one of a resistor, semiconductor device, and transistor.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding part(s) throughout:

FIG. 4B is an exemplary illustration of a bridge rectifier in accordance with a third embodiment of the present invention;

FIG. 5 is an exemplary schematic illustration of a linear regulator in accordance with the present invention;

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
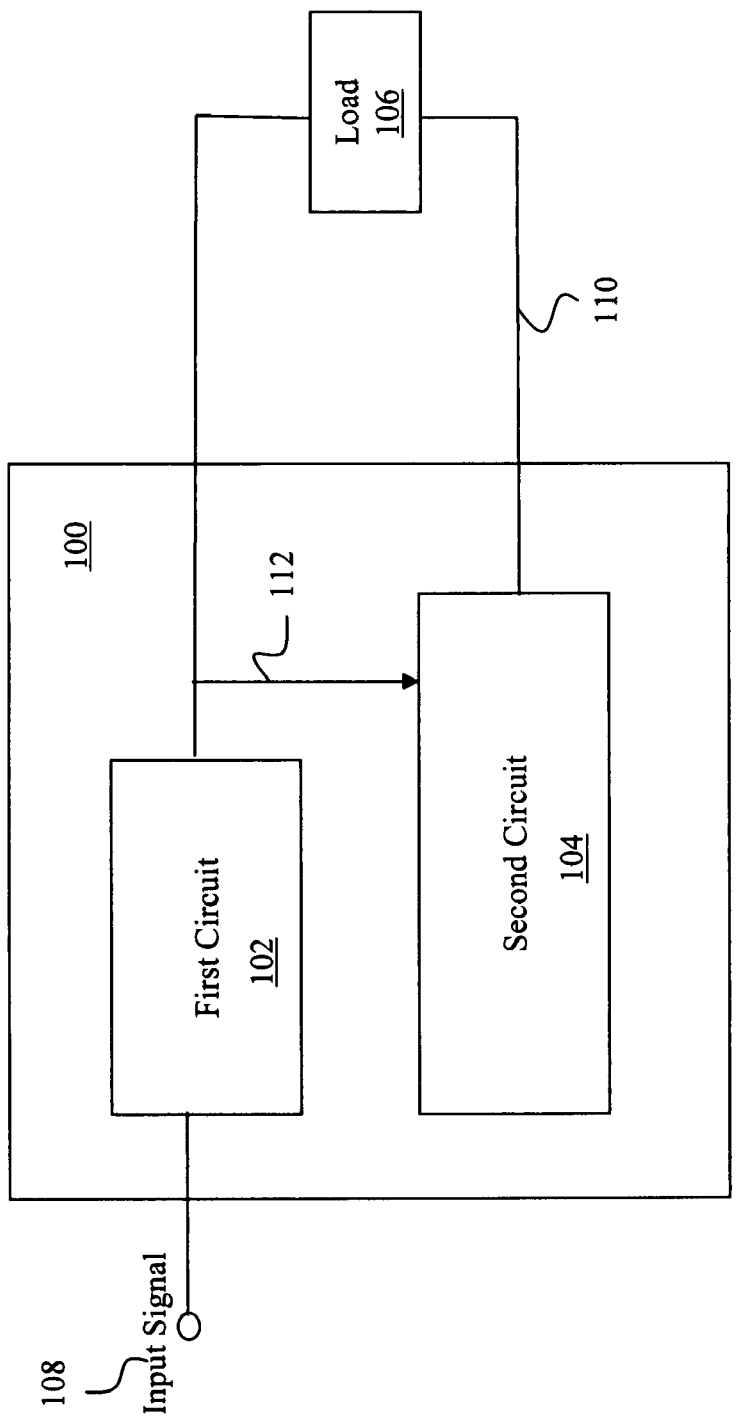
FIG. 1 is an exemplary schematic systems overview illustration of a semiconductor IC chip in accordance with the present invention.

The present invention uses patterned, substrate-on-insulator ("SOI") substrates to manufacture IC chips that can handle mixed signals. FIG. 1 is an exemplary schematic systems overview illustration of a semiconductor IC chip in accordance with the present invention. As best illustrated in FIG. 1, the present invention is comprised of a semiconductor IC chip that includes a first circuit 102 for processing a first signal 108 and includes a second circuit 104 for processing a second signal different from the first signal 108, with both the first circuit 102 and the second circuit 104 fabricated on a single substrate 100. The second circuit 104 is used for regulating a drive signal 110 for driving a load 106 using signal 112 from the first circuit 102. The present invention fabricates the first circuit 102 and the second circuit 104 with different signal processing requirements (e.g., voltage, current, power, etc.) on the same substrate 100, forming a single IC chip.

Figure 2:
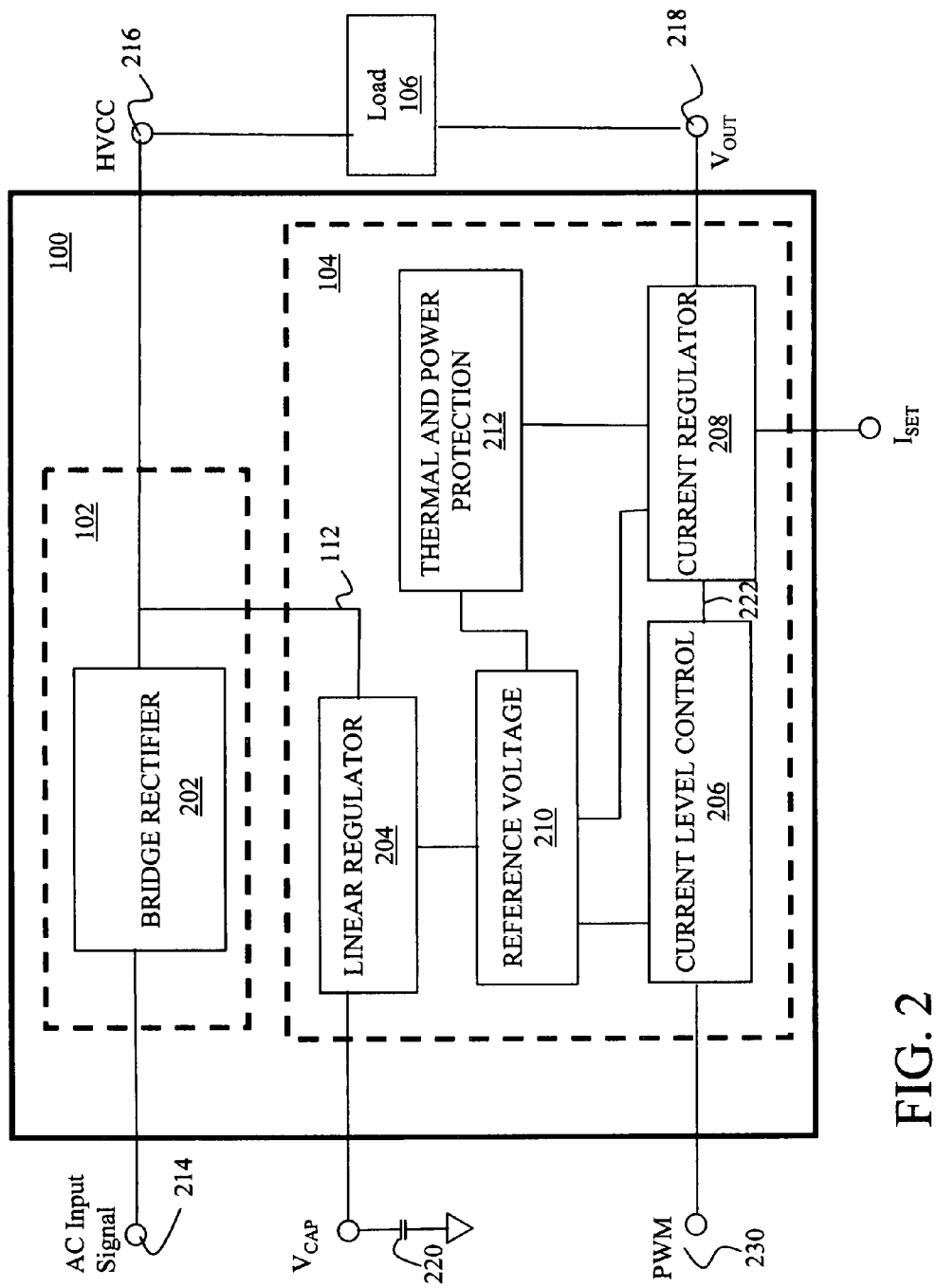
FIG. 2 is an exemplary schematic block illustration of an AC to DC semiconductor converter on a single IC chip in accordance with the present invention.

One exemplary, non-limiting application of the present invention is within the field of AC to DC converters where high AC input voltages are converted to low DC voltage signals, and require control modules for the conversion process. FIG. 2 is an exemplary schematic block illustration of an AC to DC semiconductor converter on a single IC chip in accordance with the present invention. As best illustrated in FIG. 2, the present invention provides a semiconductor circuit 100 for driving the load 106, comprising a transformerless AC to DC converter integrated circuit on a single IC chip. Non-limiting, non-exhaustive list of examples of loads 106 may include Light Emitter Diodes (LEDs), battery charges, and the like. The AC to DC converter IC of the present invention includes a high voltage circuit 102 fabricated on a substrate 100 for converting a high voltage AC input signal 214 to a first high voltage DC output signal HVCC 216, and a second circuit 104 fabricated on the same substrate 100 for regulating a drive signal 218 for driving the load 106 using current 112 from the first high voltage output signal HVCC 216. The present invention fabricates the high voltage circuit 102 and the second circuit 104 on the same substrate forming a single, transformerless AC to DC converter IC chip.

As is described in detail below, the substrate 100 of the present invention is comprised of a patterned, substrate-on-insulator pattern, insulating the high voltage circuit 102 from that of the second circuit 104, which has low voltage requirements, with both the high voltage circuit 102 and the second circuit 104 fabricated on the same substrate 100. For the one exemplary, non-limiting application of the present invention for implementing the exemplary AC to DC converter IC chip, the high voltage circuit 102 is comprised of a bridge rectifier 202 and the second circuit 104 is comprised of regulator control circuit.

The regulator control circuit (second circuit 104) is comprised of a linear regulator 204 that is coupled with the first high voltage DC output signal 112 output from the high voltage circuit 102 for providing a first low voltage signal $V_{CAP}$ for an externally coupled device 220, with the externally coupled device 220 functioning as a power storage unit and providing a second low voltage operation signal to the second circuit 104. Stated otherwise, the voltage signal $V_{CAP}$ from the external device 220 is supplied to all the components of the second circuit 104 via the linear regulator 204.

As further illustrated, the second circuit 104 further includes a current level control 206 and current regulator 208, with the current level control 206 driven by a pulse width modulator (PWM) pulse 230, which outputs a drive signal 222 that activates the current regulator 208 for a specified time. The specified time is commensurately determined by the duty cycle of the pulse width modulation pulse 230. The amount of regulated output voltage $V_{OUT}$ output by the current regulator 208 within the specified time is determined by a predetermined input current set $I_{SET}$ and the voltage reference $V_{REF}$ that is generated by the reference module 210. Further included in the second circuit 104 is a thermal and power protection module 212, which detects and compares the temperature and output current of the current regulator 208 to regulate the final current output, which is detected by the voltage $V_{OUT}$ 218 across the load 106.

Figure 3:
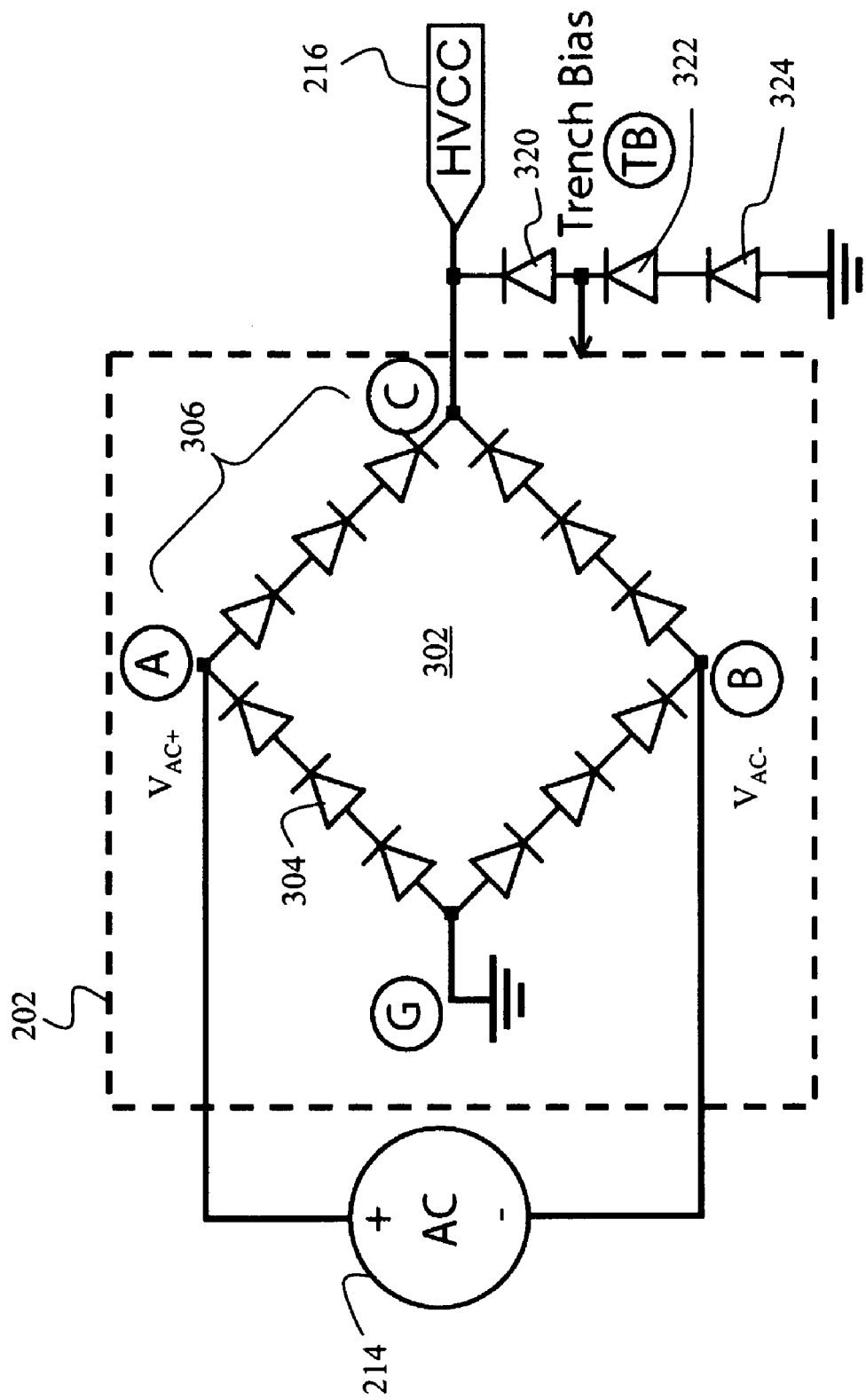
FIG. 3 is an exemplary illustration of a bridge rectifier in accordance with one embodiment of the present invention.

FIG. 3 is an exemplary illustration of a full wave bridge rectifier used in accordance with one embodiment of the present invention. As illustrated, the full wave bridge rectifier 202 is comprised of a high voltage full wave bridge rectifier 302 that includes one or more semiconductor rectifiers 304 that are coupled in series, with one or more series coupled semiconductor rectifiers 306 coupled in bridge circuit topography to provide a maximum reverse-bias potential (i.e., Peak Inverse Voltage (PIV)) that is greater than the high voltage AC input signal 214. The multiplicity of semiconductor rectifiers are coupled in series within each leg of the bridge rectifier 302 to provide the maximum reverse-bias potential (PIV) for the full wave bridge rectifier 302, which prevents the breakdown of the semiconductor rectifiers 304 in cases of the occurrences of the peak inverse voltage during AC signal processing. The full wave bridge rectifiers and their operations are well known, and are generally made using four individual diodes that use the entire AC wave cycle (both positive and negative half cycles). In general, the full wave bridge rectifiers are rated by the maximum current they can pass and the maximum reverse voltage (PIV) they can withstand (which in general, is at least some multiple of the supply Root Mean Square (RMS) voltage so the rectifier can withstand the peak inverse voltages). Accordingly, the present invention provides an exemplary three series coupled rectifiers for applications that require high voltage processing (of about 100 volts to about 150 volts or universal input voltage of about 85 VAC to about 240 VAC), however, the number of semiconductor rectifiers used should be commensurate with the voltage level processed. It should be noted that the semiconductor rectifiers are comprised of semiconductor devices coupled to function as rectifiers, a non-limiting, non-exhaustive exemplary listings of which may include diodes, Bipolar Junction Transistors (BJTs) connected to function as rectifiers, or others, including a combinations thereof. Therefore, the present invention should not be limiting to the exemplarily illustrated diodes.

In general, regardless of the specific semiconductor component used as a rectifier (e.g., diodes, Bipolar Junction Transistors (BJTs), or others that may be coupled to function as rectifiers), all semiconductor components use power to operate, and as a result generate heat. In case of diodes for example, each diode uses an exemplary 0.7 volts for operation to be biased ON and dissipates heat as a result. For the present invention, this means that each rectifier 304 within the one or more series coupled rectifiers 306 consumes a specified rate of power and generates and dissipates a specified amount of heat. Regardless of variations in the AC input signal levels, the total rate of power used and the heat dissipated by the semiconductors is commensurate with the number of semiconductor rectifiers that are coupled. Further, the rate of power used and the heat dissipated by the semiconductor rectifiers will be constant regardless of variations in the input signal levels because they all require a minimum specified power for being biased ON and as a result generate heat.

Figure 4A:
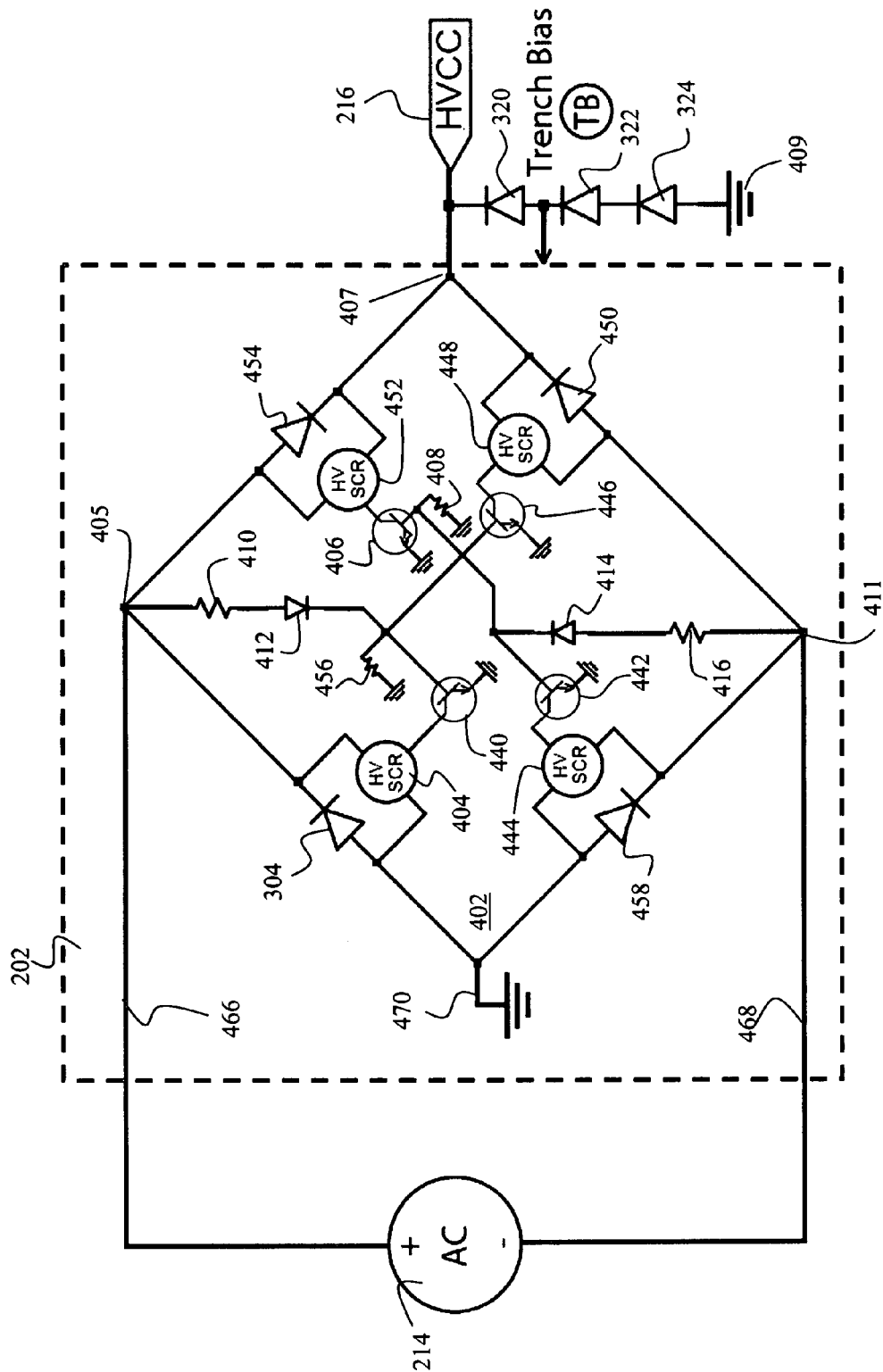
FIG. 4A is an exemplary illustration of a bridge rectifier in accordance with a second embodiment of the present invention.

FIG. 4A is an exemplary illustration of a more efficient full-wave bridge rectifier 402 in accordance with a second embodiment of the present invention. As illustrated, in order to provide a more efficient high voltage bridge rectifier circuit, the present invention couples each individual one or more semiconductor rectifiers 304, 454, 450, and 458 of the full wave bridge rectifier 402 in parallel with a respective semiconductor transistor switch 404, 452, 448, and 444. The circuit topography of the bridge rectifier 402 enables current to bypass any of the semiconductor rectifiers 304, 454, 450, or 458 that are forward biased during various periods of the full AC cycle. The bypassed current passes through the corresponding parallel coupled semiconductor transistor switch 404, 452, 448, or 444 with much smaller voltage drop for being biased ON to thereby save power, and reduce heat dissipation.

It should be noted that although only a single semiconductor rectifier 304, 454, 450, and 458 is illustrated in FIG. 4A for each leg of the bridge rectifier 402, a plurality of rectifiers (similar to those illustrated in FIG. 3) may also be used. Further, although it has been illustrated and described that the number of respective semiconductor transistor switches 404, 452, 448, and 444 is commensurate with the number of semiconductor rectifiers 304, 454, 450, and 458, this correspondence could be varied. For example, a single semiconductor transistor switch 404 may be coupled in parallel with a plurality of semiconductor rectifiers that are coupled in series, thereby biasing OFF all the series coupled semiconductor rectifiers. As one very specific example illustrated in FIG. 4B, if a leg of the full wave bridge rectifier has five series coupled semiconductor rectifiers 490 to 494, three of such rectifiers 492 to 494 may be grouped as a first set 430 and coupled in parallel with a first semiconductor transistor switch 404A. The remaining two 490 and 491 of the five rectifiers 490 to 494 are bundled as a second set 432 and coupled in parallel with a second semiconductor transistor switch 404B. This would enable current path (indicated by the arrow 434) to bypass the first set 430 of series coupled semiconductor rectifiers 492 to 494 if the first semiconductor transistor switch 404A is activated. This would mean that the current would instead pass through the parallel coupled first semiconductor transistor switch 404A (as indicated by the arrow 434). As to the remaining set 432, current will pass through this set of series coupled semiconductor rectifiers 490 and 491 while the transistor switch 404B is biased OFF. Therefore, it is only for illustrative purposes and only for clarity that a single semiconductor rectifier 304, 454, 450, and 458 is illustrated to be coupled in parallel with a semiconductor transistor switch 404, 452, 448, and 444, including any accompanying circuitry illustrated (and described further below). Non-limiting examples of semiconductor transistor switches 404A, 404B, 404, 452, 448, and 444 that can be used with the present invention may include High Voltage Silicon Controlled Rectifiers (HV SCRs), and the like.

As further illustrated in FIG. 4A, each semiconductor transistor switch 404, 452, 448, and 444 is further coupled with a biasing component 440, 406, 446, and 442 that biases ON or OFF the semiconductor transistor switch 404, 452, 448, and 444. It is only for illustrative purposes and only for clarity that a single biasing component 440, 406, 446, and 442 is illustrated for each semiconductor transistor switch 404, 452, 448, and 444. Further, a single biasing component 440, 406, 446, and 442 may bias two or more semiconductor transistor switch 404, 452, 448, and 444, simultaneously. For example, a single biasing component may bias ON or OFF both of the semiconductor transistor switch 404A and 404B, illustrated in FIG. 4B. A non-limiting example of a biasing component 440, 406, 446, and 442 is illustrated in FIG. 4A as Bipolar Junction Transistors (BJTs) 440, 406, 446, and 442.

Biasing ON the semiconductor transistor switches 404, 452, 448, and 444 enables current from the voltage AC input signal 214 to pass through the semiconductor transistor switches 404, 452, 448, and 444, bypassing any of the forward biased semiconductor rectifiers 304, 454, 450, and 458. This reduces the amount of power used and the heat dissipated by the full wave bridge rectifier because of the minimum voltage drop across the semiconductor transistor switches 404, 452, 448, and 444, while simultaneously, the remaining semiconductor rectifiers that are biased OFF continue to provide protection with respect to any existing maximum reverse-bias potential (i.e., Peak Inverse Voltage (PIV)).

In particular, during the positive half-cycle of the incoming AC signal 214 current flows along line 466 from power source AC 214 to point 405 indicated on the full wave bridge rectifier 402, and then to point 407 and output to the HVCC 216 and ground 409. In conventional full wave bridge circuit topography, this current flow would forward bias the semiconductor rectifier 454. During this positive half-cycle, the point 407 is at a lower potential than the point 411, and the semiconductor rectifier 450 is reverse biased and does not conduct current. As indicated, the current is passed through the HVCC 216 and ground 409, and flows through the ground connections from ground point 409 to ground point 470, where point 470 becomes at a higher potential than point 411. Given that point 470 is at a higher potential than point 411, current flows from the point 470 at a higher potential to the point 411 at a lower potential, and in a conventional full wave bridge rectifier, this current flow forward biases the semiconductor rectifier 458 to conduct current. At this period of the positive half-cycle, point 405 is at a higher potential than point 470, reverse biasing semiconductor rectifier 304. Current then flows back through line 468 from point 411 back to the power source 214. Simply stated, during the positive half-cycle, for conventional full wave bridge rectifiers, semiconductor rectifiers 454 is first forward biased and ON, and then semiconductor rectifier 458 is forward biased and ON, and voltage on the HVCC is positive. During the same positive half-cycle, the semiconductor rectifiers 304 and 450 are reverse biased and OFF for conventional bridge rectifiers.

In accordance with the present invention however, during the positive half-cycle when the semiconductors 454 and 458 are supposed to be forward biased and ON, the base of biasing components 442 and 406 are pulled to ground by resistor 408, and the biasing components 442 and 406 are turned OFF. As a result, the semiconductor transistor switches 452 and 444 are biased to ON. Biasing ON the semiconductor transistor switches 452 and 444 prevents the semiconductor rectifiers 454 and 458 to be forward biased, enabling all current to instead pass the semiconductor transistor switches 452 and 444 with minimum voltage drop rather than the semiconductor rectifiers 454 and 458 (that have a greater voltage drop requirements to be forwarded biased). By not forward biasing the semiconductor rectifiers 454 and 458, a minimum voltage drop is achieved through the semiconductor transistor switches 452 and 444 instead, saving power and heat dissipation while maintaining full functionality of the full wave bridge rectifier.

During the positive half-cycle, the base of the biasing components 440 and 446 are pulled to high voltage through resistor 410 and semiconductor rectifier 412. As a result, the semiconductor transistor switches 404 and 448 are biased OFF. This means that semiconductor rectifiers 304 and 450 will function normally during the positive half-cycle, which is to be reverse biased and OFF, and function to provide protection against maximum reverse-bias potential (i.e., Peak Inverse Voltage (PIV)).

During the negative half-cycle of the incoming AC signal 214 current flows along line 468 from power source AC 214 to point 411 indicated on the full wave bridge rectifier 402, where point 411 will have a higher potential than point 407. Current will flow from the higher potential point 411 to the lower potential point 407 and output to the HVCC 216 and ground 409. In conventional full wave bridge rectifier circuit topography, this current flow would forward bias the semiconductor rectifier 450. During this negative half-cycle, the ground point 470 is at a lower potential than the point 411, and the semiconductor rectifier 458 is reverse biased and does not conduct current. The current is passed through the HVCC 216 and ground 409, and flows through the ground connections from ground point 409 to ground point 470, where point 470 becomes at a higher potential than point 405. Given that point 470 is at a higher potential than point 405, current flows from the point 470 at a higher potential to the point 405 at a lower potential, and in a conventional full wave bridge rectifier, this current flow forward biases the semiconductor rectifier 304 to conduct current. At this period of the negative half-cycle, point 405 is at a lower potential than point 407, which means that the semiconductor rectifier 454 is reverse biased and OFF. Current will therefore flow back through line 466 from point 405 back to the power source 214. Simply stated, during the negative half-cycle, for conventional full wave bridge rectifiers, semiconductor rectifiers 304 is first forward biased and ON, and then semiconductor rectifier 450 is forward biased and ON, and voltage on the HVCC is positive. During the same negative half-cycle, the semiconductor rectifiers 454 and 458 are reverse biased and OFF for conventional bridge rectifiers.

In accordance with the present invention however, during the negative half-cycle when the semiconductors 450 and 304 are supposed to be forward biased and ON, the base of biasing components 440 and 446 are pulled to ground by resistor 456, and the biasing components 440 and 446 are turned OFF. As a result, the semiconductor transistor switches 448 and 404 are biased to ON. Biasing ON the semiconductor transistor switches 448 and 404 prevents the semiconductor rectifiers 450 and 304 to be forward biased, enabling all current to instead pass the semiconductor transistor switches 448 and 404 with minimum voltage drop rather than the semiconductor rectifiers 450 and 304 (that have a greater voltage drop requirements to be forwarded biased). By not forward biasing the semiconductor rectifiers 450 and 304, a minimum voltage drop is achieved through the semiconductor transistor switches 448 and 404 instead, saving power and heat dissipation while maintaining full functionality of the full wave bridge rectifier.

During the negative half-cycle, the base of the biasing components 406 and 442 are pulled to high voltage through resistor 416 and semiconductor rectifier 414. As a result, the semiconductor transistor switches 444 and 452 are biased OFF. This means that semiconductor rectifiers 454 and 458 will function normally during the negative half-cycle, which is to be reverse biased and OFF, and function to provide protection against maximum reverse-bias potential (i.e., Peak Inverse Voltage (PIV)).

As further illustrated in both FIGS. 3 and 4A, the first high voltage DC output signal 216 is coupled with at least one semiconductor rectifier 320, 322, and 324, with another end of the at least one semiconductor rectifier coupled with ground 409, providing a trench bias (trench formations for fabrication of substrate-on-insulator semiconductors in accordance with the present invention are described below).

Referring back to FIG. 2, as further illustrated and stated above, the second circuit 104 is comprised of regulator control circuits that includes a linear regulator 204 coupled with the first high voltage DC output signal 112 output from the high voltage circuit 102 for providing a first low voltage signal $V_{OUT}$ for an externally coupled device 220, with the externally coupled device 220 functioning as a power storage unit and providing a second low voltage operation signal to the second circuit 104. Stated otherwise, the voltage signal $V_{CAP}$ from the external device 220 is supplied to all the components of the second circuit 104 via the linear regulator 204. The externally coupled device 220 may take the form of a capacitor and is charged via the linear regulator 204.

FIG. 5 is an exemplary schematic illustration of a linear regulator used within the second circuit in accordance with the present invention. It should be noted that such linear regulators are well known and therefore, will be described briefly. As illustrated in FIGS. 2 and 5, the second circuit 104 is supplied current through the first high voltage DC output signal 112 from the high voltage circuit 102. As illustrated in FIG. 5, the first high voltage circuit 102 and the second circuit 104 are coupled though an intermediary circuit 520, with the intermediary circuit 520 lowering a high voltage input from the first high voltage circuit 104 and coupling a lower voltage to the second circuit 104. Non-limiting examples of intermediary circuit 520 may include any device with an impedance characteristics that could step down (lower) an electric parameter (e.g., voltage, current, power, etc.) to a level compatible with the second circuit 104. Non-limiting examples of such impedance devices may include resistors, transistors, or any combination thereof. As further illustrated, the linear regulator 204 includes an operational amplifier 502 with a first operational amplifier input 504 coupled with the reference voltage 506, and a second operational amplifier input 508 coupled with the output signal of the intermediary circuit 250 through a series coupled set of resistors 510 and 512, with the operational amplifier driving a shunt transistor 514 for maintaining and providing the first low voltage signal 112 to the externally coupled device 220. In other words, the operational amplifier 502 shunts the transistor 514 to ground to allow excess voltage from first high voltage DC output signal 112 to ground so that the external device 220 will be maintained at a voltage level set or specified by the voltage reference $V_{REF}$ 506. Resistors 510 and 512 function as a voltage dividing circuit.

Referring back to FIG. 2, the second circuit 104 further includes a well-known reference voltage module 210 coupled with the linear regulator and other components of the second circuit 104 for providing a reference voltage from which the first low voltage signal (that supplies voltage to the externally coupled device 220) is determined. In general, the reference voltage may be generated through bandgap reference of a transistor, which is well-known. In the design of various analog circuits, such as voltage regulators, it is necessary to establish an independent bias reference within the circuit. This stable bias reference can be either a current or a voltage. In most applications, voltage rather than current references are preferred since they are easier to interface with the rest of the circuitry. Voltage references are required to provide a substantially constant output voltage regardless of changes in input voltage, output current, or temperature.

Temperature-compensated bias references are described in a number of publications, including U.S. Pat. No. 6,294,902 to Marland et al., the entire disclosure of which is expressly incorporated by reference herein. In designing temperature-compensated bias references, one starts with a predictable temperature drift, and then finds another predictable temperature source with temperature drift in the opposite direction that can be scaled by a temperature independent scale factor. Then, by proper circuit design, the effects of the two opposite-polarity drifts are made to cancel, resulting in a nominally zero temperature coefficient voltage level.

Three basic temperature drift sources exist that are reasonably predictable and repeatable. The first is the temperature dependence of a bipolar transistor base-emitter voltage drop $V_{BE}$ that exhibits a strong negative temperature coefficient, typically about −2 mV/° C. The second is the temperature dependence of the $V_{BE}$ difference $\Delta V_{BE}$ between two transistors, which is proportional to absolute temperature through the thermal voltage $V_T$ and thus exhibits a positive temperature coefficient. The third and last temperature drift source is that of the base-emitter voltage of a Zener diode $V_Z$, which is inherently low and positive in polarity.

By scaling one or more of these drift sources and subtracting them from each other, one may achieve the required compensation to provide a temperature independent bias voltage. Most voltage references are generally based on either Zener diodes or bandgap generated voltages. Zener devices characteristically exhibit high power dissipation and poor noise specifications. Bandgap generated voltage references compensate the negative $V_{BE}$ temperature drift with the positive thermal voltage temperature coefficient of $V_T$, with VT equal to kT/q, where k is Boltzmann's constant, T is the absolute temperature in degrees Kelvin and q is the electron charge.

In a simplified model, the output reference voltage $V_{out}$ may be expressed as:

$$V_{out}=V_{BE}+KV_r$$

Since the two terms in the above equation exhibit opposite-polarity temperature drifts, it should be possible, at least in theory, to make $V_{out}$ nominally independent of temperature. A temperature-stabilized output dc level, in which Vout/dT is nominally equal to zero, is realized at an output voltage level on the order of +1.25V, which is very near the bandgap voltage of silicon. The name bandgap reference is derived from this relationship. Numerous variations in the bandgap reference circuitry have been designed, and are discussed for example in the U.S. Pat. Nos. 5,352,973 and 5,291,122 to Audy.

As further illustrated in FIG. 2, the second circuit is further comprised of a well-known current level control 206 for activating a well-known current regulator 208 for a specified time. The current regulator 208 outputs a predetermined amount of regulated output current 218 within the specified time set by the current level control 206.

Figure 6:
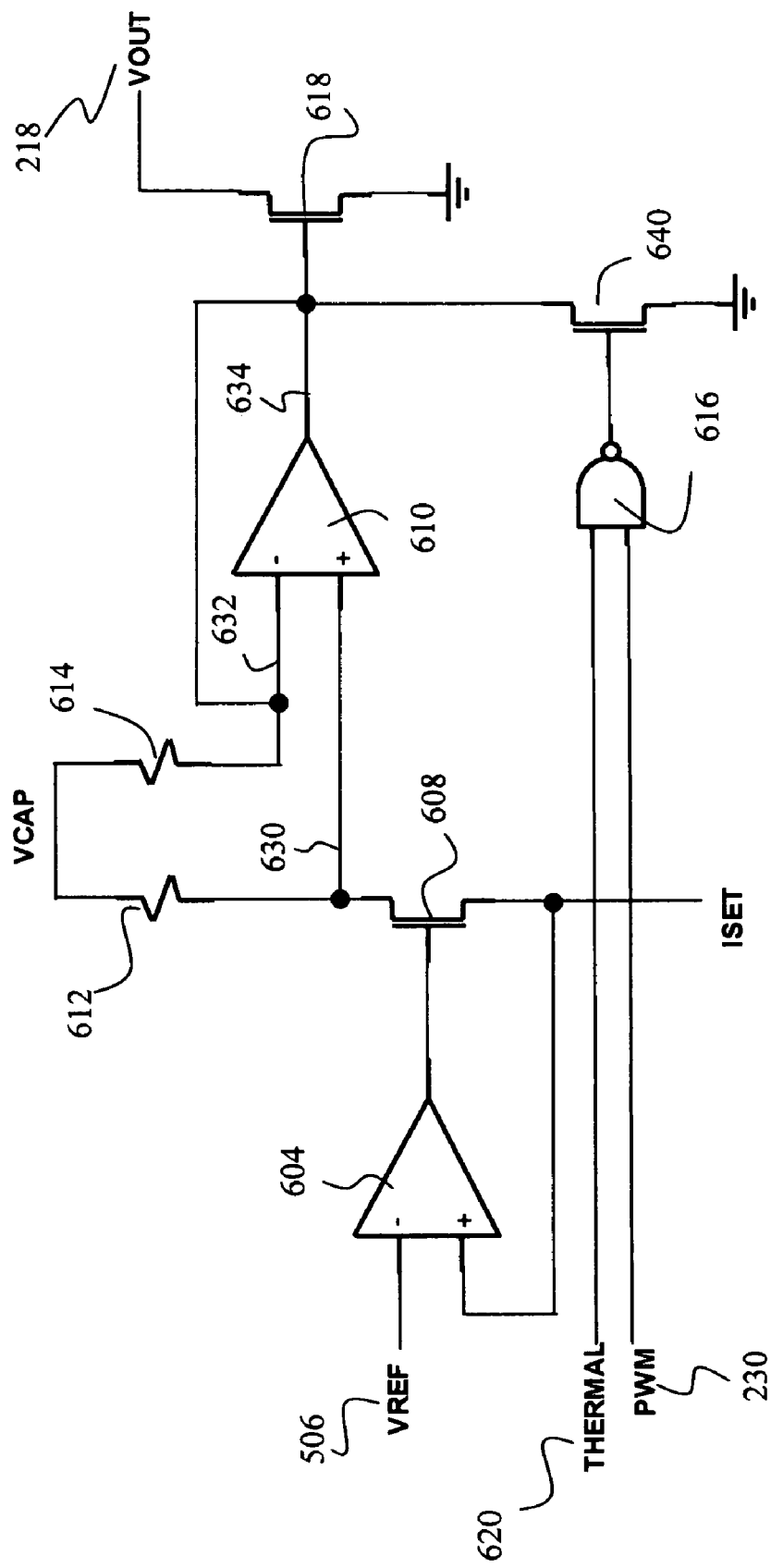
FIG. 6 is an exemplary schematic illustration of the current level control and the current regulator in accordance with the present invention.

FIG. 6 is an exemplary schematic illustration of the current level control and the current regulator illustrated in FIG. 2 in accordance with the present invention. It should be noted that such current level controls and current regulators are well known and therefore, will be described briefly. As illustrated, the current level control 206 is driven by a pulse width modulator (PWM) pulse 230, and outputs a drive signal 222 that activates the current regulator 208 for a specified time, which is commensurately determined by the duty cycle of the pulse width modulation pulse 230. The amount of regulated output $V_{OUT}$ output by the current regulator 208 within the specified time is determined by a predetermined input current set $I_{SET}$ and the voltage reference $V_{REF}$. The $V_{REF}$ and $I_{SET}$ are compared by a comparator 604, which drives a transistor 608 to allow current from $V_{CAP}$ to compensate for deficiencies, and output the regulated voltage $V_{OUT}$. The current $I_{SET}$ through resistor 612 generates a voltage across the first input 630 of the operational amplifier 610. This sets a second voltage across the second input 632 of the operational amplifier 610, forcing a current through resistor 614, which is output to the output 634 of the operational amplifier 610. The impedance ratio between resistors 612 and 614 is directly proportional to the ratio of current $I_{SET}$ and the current through transistor 618, which set the $V_{OUT}$ 218. The signal 620 (THERMAL) from the Thermal and Power Protection module 212 or the signal 230 (PWM) when at LOW, reset the entire circuit and shuts-OFF transistor 618 via the NAND gate 616. A high signal level at the output of the NAND gate 616 biases ON the transistor 640, which pulls current to ground to thereby bias OFF the transistor 618.

Figure 7:
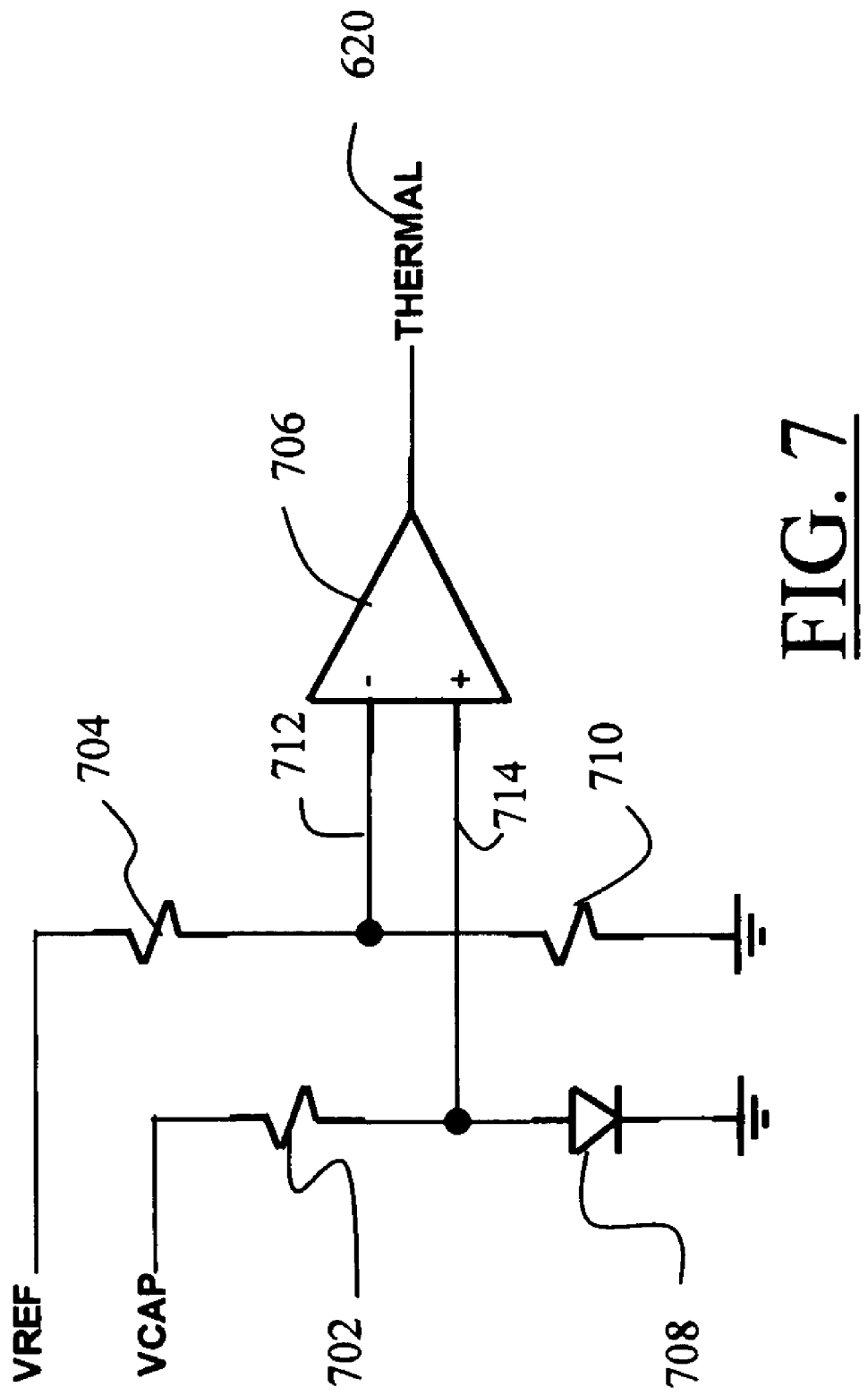
FIG. 7 is an exemplary schematic illustration of the thermal and power protection module in accordance with the present invention.

Referring back to FIG. 2, the second circuit 104 further includes a well-known thermal and power protection module 212. The thermal protection is provided for determining a temperature of the current regulator 208 and shutting off the current regulator 208 if the temperature exceeds a predetermined threshold level, and the power protection is provided for shutting off the current regular 208 if regulated output current exceeds a predetermined threshold level. In general, the thermal protection threshold is provided by temperature-compensated bias reference, which is well-known, and the power protection detects the amount of power by detecting the regulated output current output from the current regulator 208 and the amount of voltage across the load 106. FIG. 7 is an exemplary schematic illustration of the thermal and power protection module 212 illustrated in FIG. 2 in accordance with the present invention. It should be noted that such circuits are well known and therefore, will be described briefly. As illustrated in FIG. 7, the Thermal and Power Protection module 212 is comprised of a comparator 706 with a first input 712 coupled with a voltage divider circuit comprised of series coupled resistors 704 and 710. The voltage-divided input from the voltage divider circuit is compared by the comparator 706 with the voltage from the diode 708, which is supplied across the second input 714 of the comparator 706. If the temperature of any adjacent silicon based circuits is increased, the forward bias voltage of the diode 708 is reduced to less than the voltage-divided voltage from $V_{REF}$ (across first input 712), with the comparator 706 outputting a LOW THERMAL signal level 620; otherwise, a HIGH THERMAL signal level 620 is output. As indicated above in relation to FIG. 6, the THERMAL signal 620 is input as one parameter for causing the activation of the current regulator 208.

Figure 8:
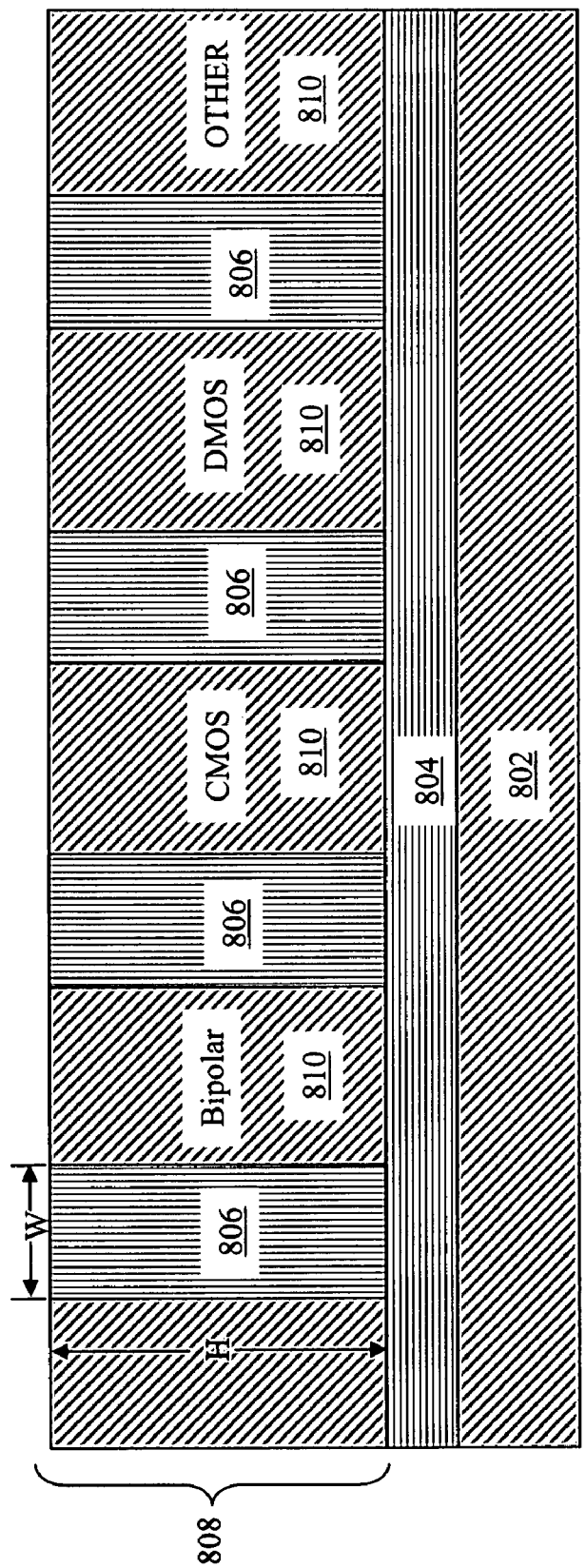
FIG. 8 is an exemplary cross-sectional illustration of a patterned substrate-on-insulator circuit topography in accordance with the present invention.

As stated in relation to FIG. 2, the present invention fabricates the high voltage circuit 102 and the second circuit 104 on the same substrate 100 forming a single, transformerless AC to DC converter IC chip, using patterned, substrate-on-insulator ("SOI") substrates manufacturing techniques so to handle mixed signals. FIG. 8 is an exemplary cross-sectional illustration of a patterned substrate-on-insulator circuit topography in accordance with the present invention. As illustrated, the patterned, substrate-on-insulator topography of the present invention is comprised of an insulator layer 804 for insulating a device substrate 808 from a base substrate 802. The insulator layer 804 may be comprised of a buried oxide layer. The insulator layer 804 further includes vertically oriented trenches 806, normal to the device substrate 802, separating and insulating the device substrate 808 into isolated device substrate regions 810. One or more isolated device substrate regions 810 include the first high voltage circuit 102 and the second circuit 104 components. Each isolated device substrate region of the one or more isolated device substrate regions 810 includes one or more semiconductor devices, with a plurality of isolated device substrate regions 810 and the one or more semiconductor devices within each isolated device substrate region 810 forming the single transformerless AC to DC converter IC chip.

Figure 9A:
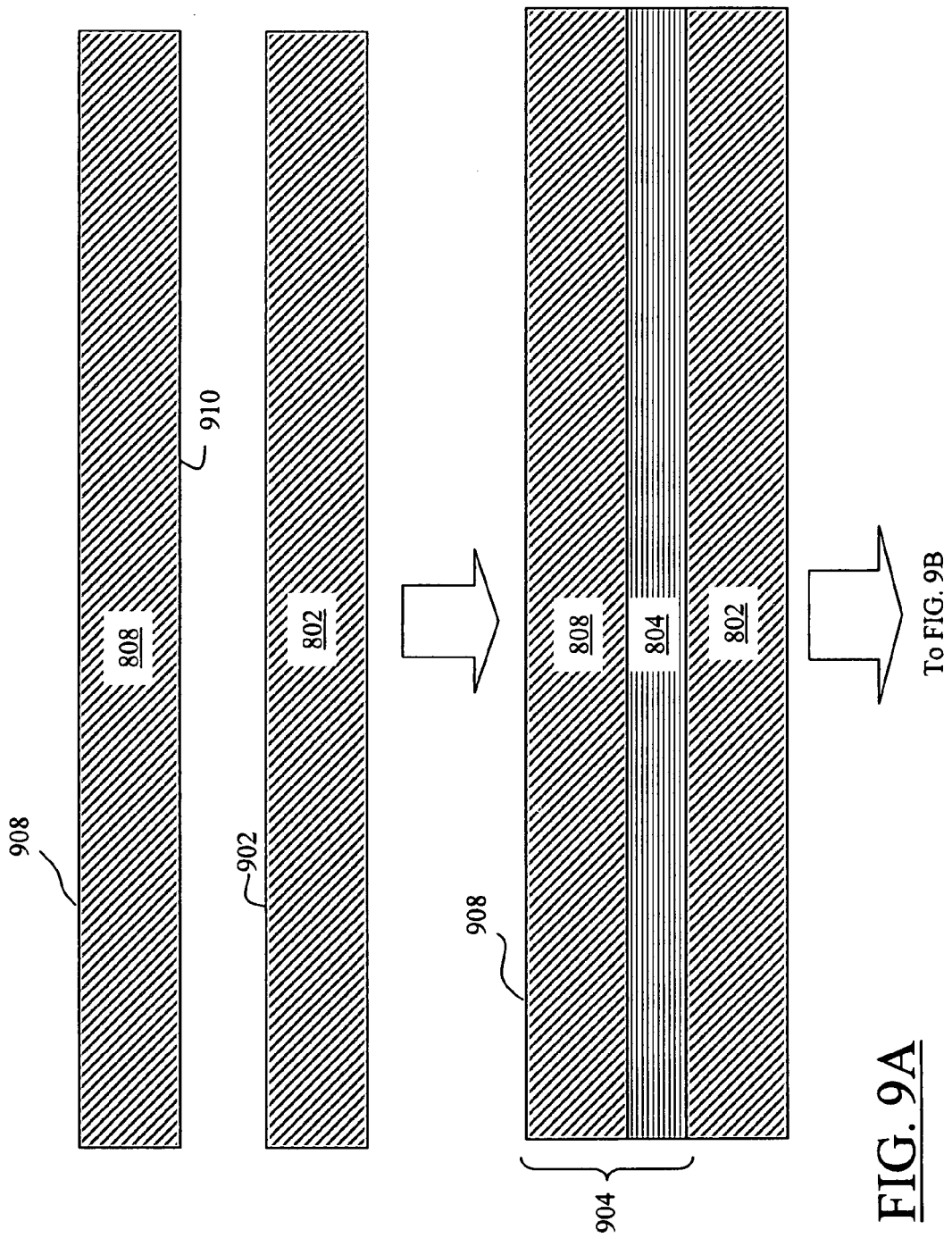
FIGS. 9A and 9B are exemplary illustrations of a fabrication method of the semiconductor device of FIG. 2 in accordance with the present invention.
Figure 9B:
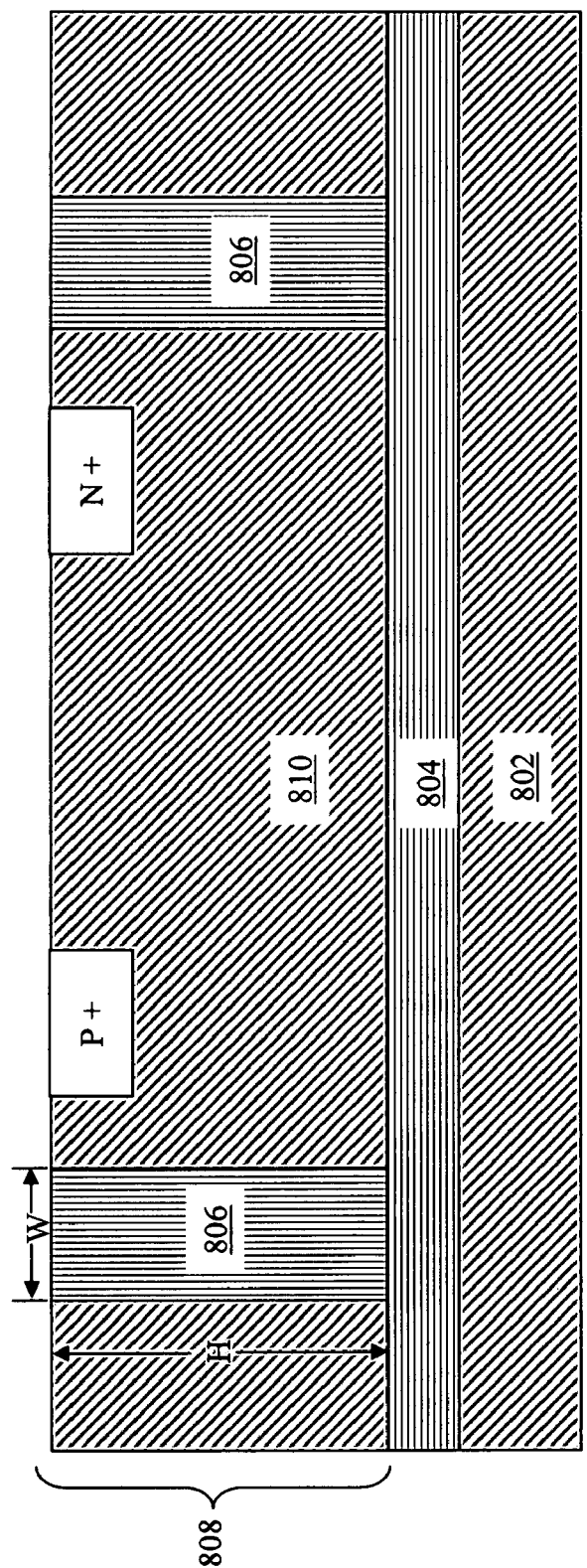

FIGS. 9A and 9B are exemplary illustrations of a fabrication method of the semiconductor device in accordance with the present invention. As illustrated, the semiconductor device fabrication method includes providing a first substrate 802 having a first surface 902, and providing a second substrate 808. The first substrate 802 may also be termed a handle wafer, and the second substrate 808 a device wafer, with the device wafer forming a device substrate. Further included in the processing of fabricating the semiconductor device is the functional act of bonding the second substrate 808 on the first surface 902 of the first substrate 802 using an insulator bonding layer 804 to form a single piece, bulk substrate with the second substrate 808 and the insulator bonding layer 804 forming a substrate-on-insulator region 904.

The insulator bonding layer 804 is grown on the first surface 902 of the first substrate 802, and also on the bottom surface 910 of the second substrate 808. The bottom surface 910 of the second substrate 808 with the insulator bonding layer 804 grown thereon is then pressed against the first surface 902 of the first substrate 802 (with its growth of the insulator bonding layer 804) to form a bond between the two substrates 802 and 808. A non-limiting example of a bonding insulator layer 804 may comprise of an Oxide layer (a buried oxide layer).

Although not shown, another functional act for fabricating the semiconductor device is to prepare the top surface 908 of the second substrate 808, which includes grinding and polishing the top surface 908 to allow for the formation of different technology based individual semiconductor components thereon. In general, the first substrate 802 is polished to remove any remaining excess oxide layer. As best illustrated in FIG. 9B, further included in the processing of fabricating the semiconductor device is the functional act of forming a trench region 806 on the substrate-on-insulator region 808, separating the substrate-on-insulator region 808 into separate, isolated active regions 810. The trench regions 806 are formed by removing portions of the substrate-on-insulator region 808, forming vertically oriented trenches 806. The methods of removing of portions of the substrate-on-insulator 808 to form trenches 806 are numerous and may be performed by a variety of well-known semiconductor fabrication techniques, a non-limiting example of which may include masking certain areas of the substrate-on-insulator region 808 that will form the isolated active regions 810, and etching a remaining areas of the substrate-on-insulator region 810 to form the trenches 806.

As further illustrated in FIG. 9B, the processing of fabricating the semiconductor device of the present invention further includes the functional act of filling a trench region 806 with an insulator to insulate the separate, isolated active regions 810. Filling the trench regions 806 with insulator includes growing an oxide layer within an inner surface of the trench regions 806, and filling the trench regions 806 with poly-silicon. The silicon oxide filled in the trenches 806 merge 1104 with the buried oxide layer 804 between the device substrate 808 and the base substrate 802, forming the separate, isolated active regions or tubs 810. In general, the width "W" of the trench region 806 is approximately 1 to 2 micrometers or less. The small trench areas of 1 or 2 micrometers or less provides room for a larger real estate for the active regions 810 to accommodate for a greater density of semiconductor components on a single substrate. As best illustrated in FIG. 9B (with the exemplary P and the N junctions of the semiconductor component), the method of fabricating the semiconductor device further includes the functional act of forming one or more individual semiconductor components within the separate, isolated active regions 810, isolating each of the high voltage individual semiconductor components and others to form a substrate-on-insulator semiconductor device. It should be noted that FIGS. 9A and 9B merely illustrate only a few or a single (FIG. 9B) active region 810 for the semiconductor device of the present invention. However, it is only for illustrative purposes and only for clarity that a few or a single active region 810 is illustrated.

Figure 10:
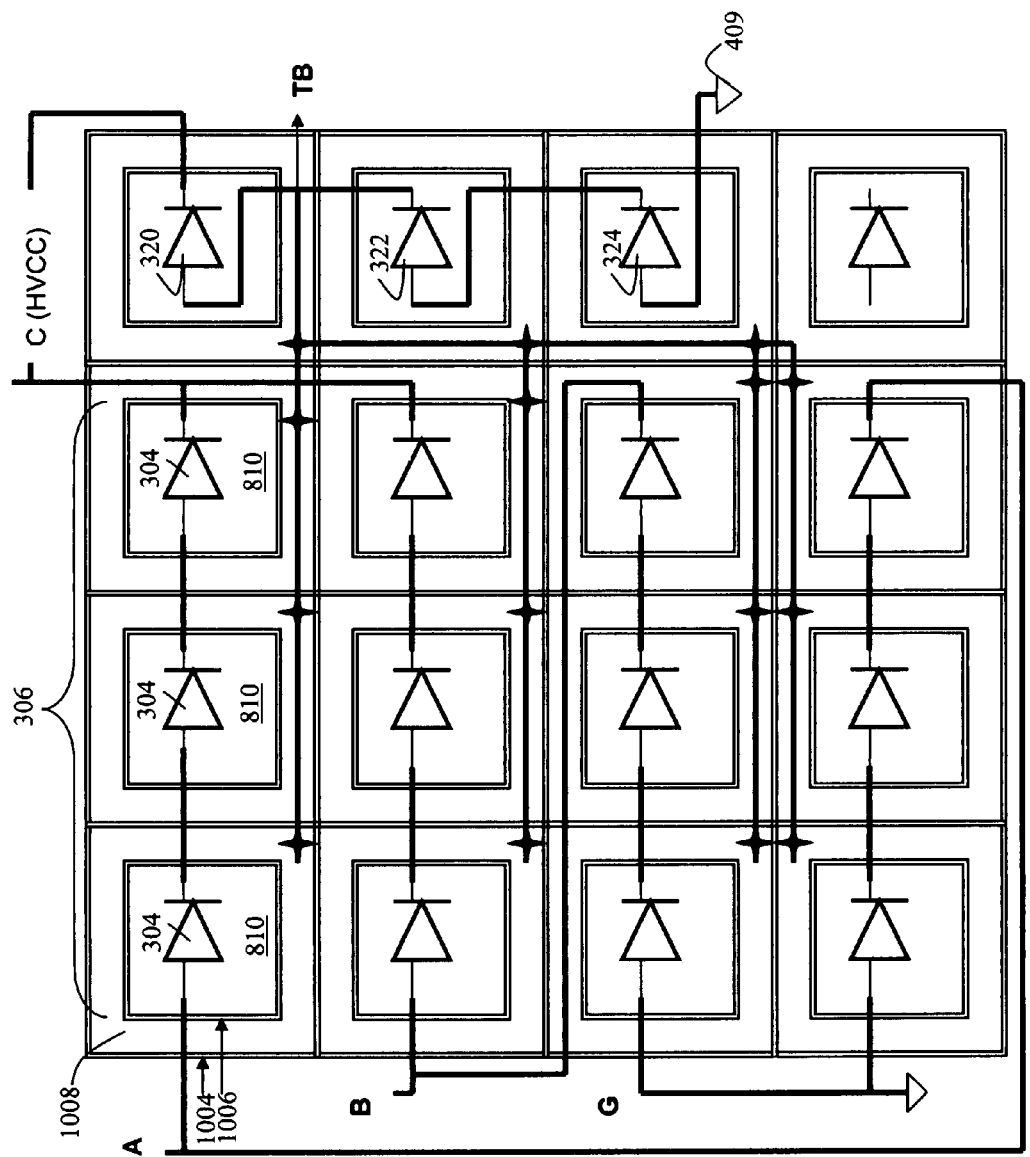
FIG. 10 is an exemplary schematic plan view illustration of FIG. 3, with one or more individually formed semiconductor components within the separate, isolated active regions, isolated by dual trenches in accordance with the present invention.

FIG. 10 is an exemplary schematic plan view illustration of part of the semiconductor device of the present invention, with individually formed semiconductor components within the separate, isolated active regions, isolated by dual trenches. In particular, FIG. 10 exemplarily illustrates an implementation of the first circuit 102 (high voltage) that includes the full wave bridge rectifier 202 with the circuit topography schematically illustrated in FIG. 3. As illustrated, high voltage semiconductor components 304 are formed within the separate, isolated active region 810, isolated by one or more external trench regions 1004 and one or more internal trench regions 1006. Accordingly, the trench regions 806 are comprised of a trench topography that includes one or more external trench regions 1004 and one or more internal trench regions 1006, in between which is a region 1008, with the external and internal trench regions 1004 and 1006 biased by the signal voltage trench bias (TB) for maintaining a substantially equal potential difference between adjacent trenches to prevent a break down of the trench regions (silicon breakdown). The trench bias TB allows the adjacent trench regions to "see" a potential difference that is less than the breakdown potential of the material from which the trenches are made, and is generated by the voltage across one or more semiconductor rectifiers 320, 322, and 324.

Figure 11:
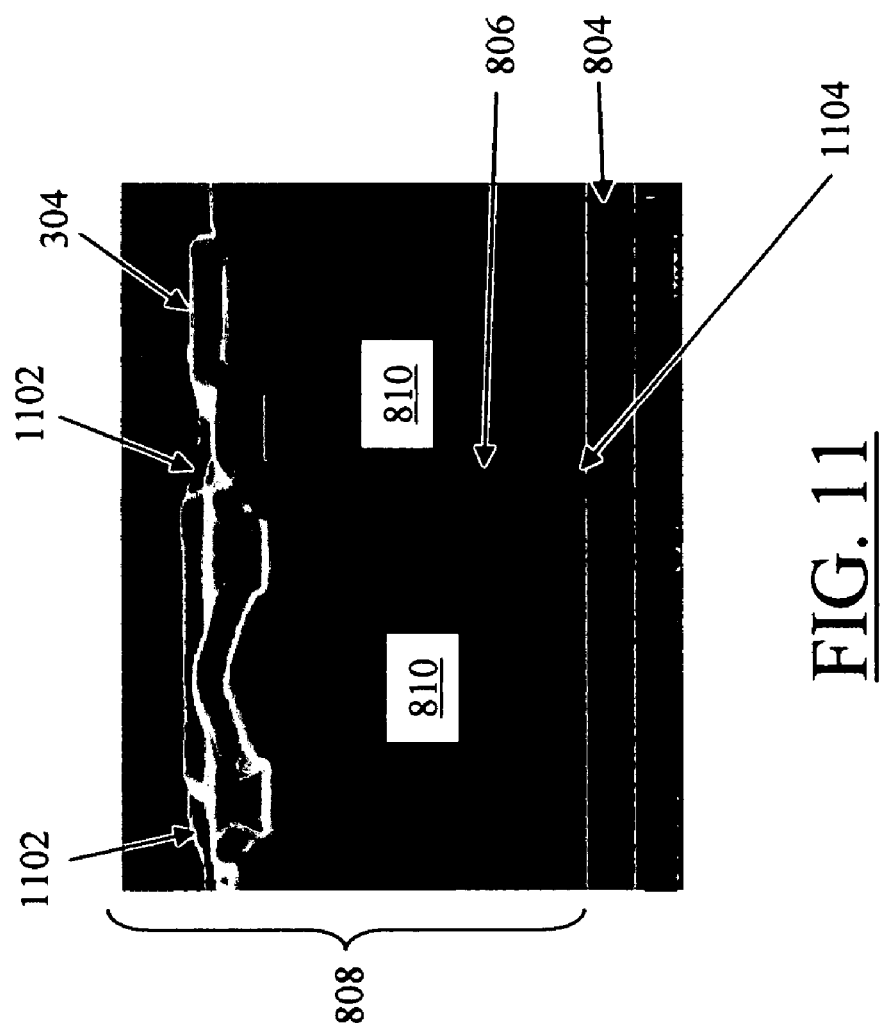
FIG. 11 is an exemplary partial cross-section view of the semiconductor device of the present invention using a Scanning Electron Microscopy (SEM)

Given that all semiconductor components of FIG. 3 are high voltage, each high voltage individual semiconductor component is individually formed within an isolated active region 810 as illustrated in FIG. 10. If a semiconductor component is a high voltage semiconductor component, then it is preferred that the high voltage semiconductor component be isolated and individually formed within an isolated active regions 810, as illustrated in FIGS. 10 and 11. Accordingly, only a single, individual high voltage semiconductor component is formed within a single, isolated active region 810. On the other hand, one or more non-high voltage semiconductor components may be combined and formed within a single isolated active regions 810. In other words, the individual semiconductor components can be combined and placed within the same trench tub 810 so long as the combination of one or more individual semiconductor components formed within an isolated active region 810 does not challenge the high voltage breakdown of the trenches. Non-limiting, non-exhaustive exemplary listings of semiconductor components used may include diodes, Bipolar Junction Transistors (BJTs), MOSFETs, or other technologies such as DMOS, including a combinations thereof. Therefore, the present invention should not be limiting to the exemplarily illustrated semiconductor components illustrated in FIG. 10.

As best illustrated in FIG. 11, the one or more individual semiconductor components and their combination that constitute the entire circuitry of the AC to DC converter illustrated in FIG. 2 that are disclosed and described are formed within the separate, isolated active regions 810 are coupled with one another by a conductor 1102 that crosses over the trench regions 806 to form the semiconductor device. The combination of one or more individual semiconductor components form the first high voltage circuit 102, and the combination of one or more individual other semiconductor components that form the second circuit 104 that constitute a regulator circuit are coupled with one another by the conductor 1102. The first high voltage circuit 102 and the second circuit 104 are coupled through one or more intermediary circuits 520 by the conductor 1102, with the intermediary circuit 520 lowering a high voltage input from the first high voltage circuit 102 and coupling a lower voltage to the second circuit 104. Non-limiting, non-exhaustive listing of components that can form the intermediary circuits 520 may include resistor(s), transistor(s), and so on, with all individual intermediary circuit components preferably isolated within its own isolated active region 810 and interconnected by the conductor 1102. For example, if a Bipolar Junction Transistor (BJT) is used as the intermediary circuits 520 instead of a simple resistor, the Collector of the BJT can be biased and coupled with a first voltage of the first circuit 102 through the conductor 1102, and the Emitter of the same BJT biased and coupled with a second voltage of the second circuit 104 through another similar conductor 1102, with the first voltage being greater than the second voltage.

Figure 12:
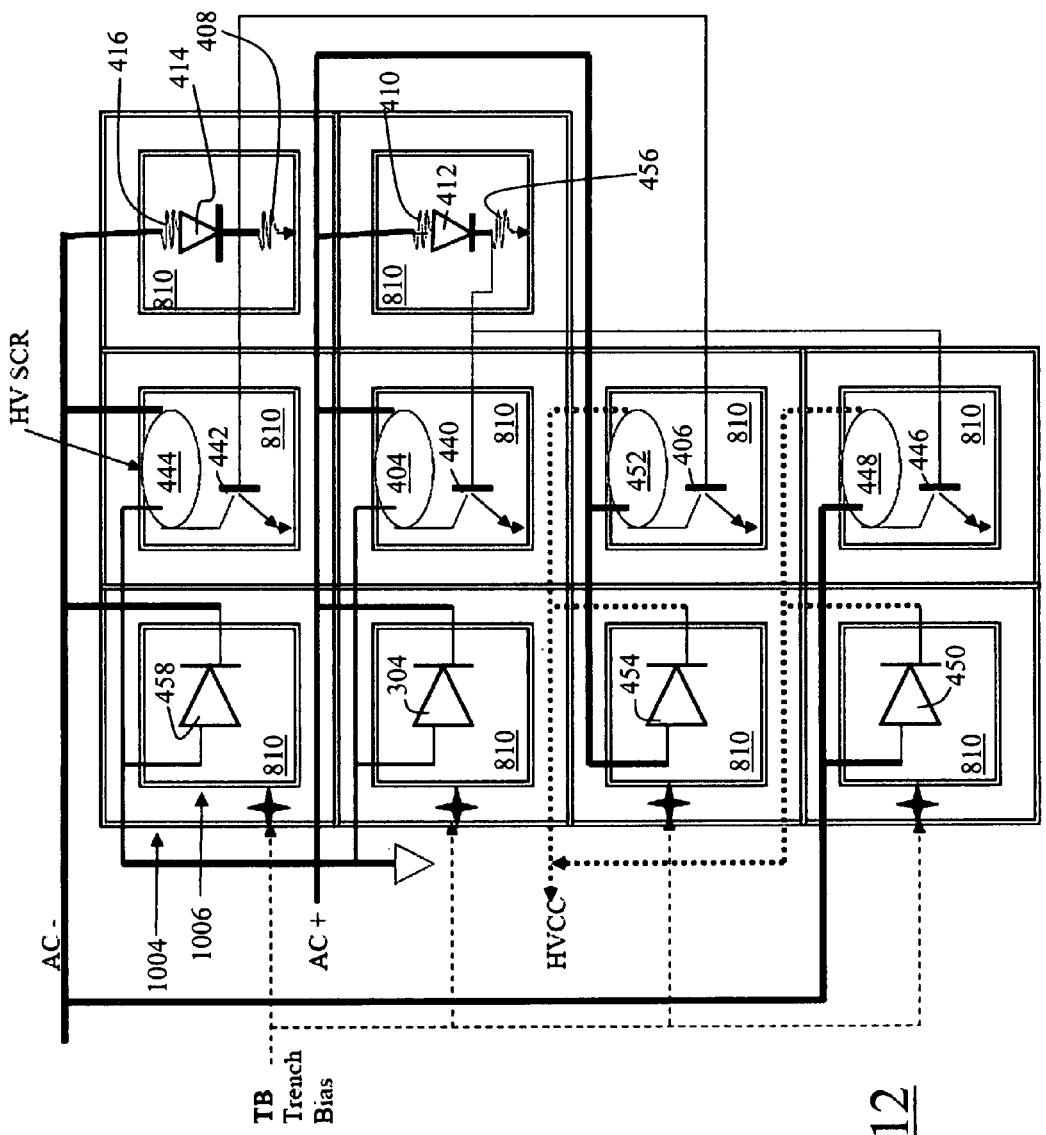
FIG. 12 is an exemplary schematic plan view illustration of FIG. 4A, with one or more individually formed semiconductor components within the separate, isolated active regions, isolated by dual trenches in accordance with the present invention.

FIG. 12 is an exemplary schematic plan view illustration of part of the semiconductor device of the present invention, with individually formed semiconductor components within the separate, isolated active regions, isolated by dual trenches. In particular, FIG. 12 merely illustrates an exemplary implementation of the first circuit 102 that includes the full wave bridge rectifier 202 with the circuit topography 402 schematically illustrated in FIG. 4A. As illustrated in FIG. 12, one or more semiconductor components are formed within the separate, isolated active region 810, isolated by one or more external trench regions 1004 and one or more internal trench regions 1006. As illustrated, the high voltage semiconductor components 304, 454, 458, and 450 are individually formed within a single, isolated active region 810. On the other hand, one or more non-high voltage semiconductor components such as the biasing components 442, 440, 406, and 446, and the semiconductor transistor switches 444, 404, 452, and 448, may be combined and formed within a single isolated active regions 810. The semiconductor transistor switches such as the high voltage silicon control rectifiers (HV SCR) and the biasing components such as bipolar junction transistors (BJT) are combined and formed within the single, isolated active region 810 by forming junctions for HV SCR. It is well-known that HV SCR is comprised of a PNP and NPN junctions, whereby the NPN junction functions as the gate of the HV SCR and the PNP junctions are used to bias ON or OFF the NPN gate junction of the HV SCR. It should be noted that a PNP junction is the same as those for a BJT junction and hence, an HV SCR intrinsically (inherently) includes a parasitic BJT component. In other words, although two separate components are illustrated in the isolated active region 810 (HV SCRs and BJTs), there is actually a single component HV SCR that inherently includes a BJT.

As further illustrated, the resistor 416, 408 and the semiconductor rectifier 414 (also illustrated in FIG. 4A and described) also constitute the low voltage components of the "high voltage" circuit 102, and hence they are combined into a single, isolate active region 810, just as the resistors 410, 456, and the semiconductor rectifier 412. Accordingly, in implementing the first circuit 102 and the second circuit 104 of FIG. 1, isolation and protection is achieved not by isolating the entire first circuit 102 from that of second circuit 104, but by isolating the high voltage semiconductor components of the first circuit and the second circuit (if any) from those of non-high voltage semiconductor components.

It should be noted that it is only for illustrative purpose and clarity that the only the semiconductor components of FIGS. 3 and 4A are illustrated in the format of respective FIGS. 10 and 12. Every semiconductor component described and disclosed throughout the disclosure (FIGS. 2 to 7) may individually or in combination with other semiconductor components be formed within the separate, isolated active regions 810, isolated by dual trenches, and illustrated in the formats of FIGS. 10 and 12. Therefore, it is only for the sake of brevity, clarity, convenience, and to avoid duplication that the general description and drawing figures for the remaining circuitries (all of which are shown in FIGS. 2 to 7) and their respect semiconductor components illustrated and described throughout the entire disclosure is not repeated or shown in the same format as FIGS. 10 and 12. Accordingly, all the individual semiconductor components that comprise all the individual modules exemplarily illustrated in FIGS. 2 to 7 are individually or in combination formed within the separate, isolated active regions 810, isolated by dual trenches as illustrated in FIGS. 10 and 12.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the illustrated diodes in the bridge rectifier can be replaced by any device with a low forward voltage and high PIV, and the HV SCRs can be replaced by other similar devices such as Insulated Gate Bipolar Transistors (IGBT) devices. A non-limiting example of a substrate that may be used in substrates-on-insulator or SOI may preferably be silicon. The number, size, and dimensions of each individual isolated active region 810 may be varied. For example, small isolated active regions 810 may be formed for single high voltage semiconductor components, and a single large size isolated active region 810 may be formed for forming all the remaining low voltage semiconductor components. Further, although FIGS. 10 and 12 illustrate each individual isolated active region 810 as equally sized, the illustration of the sizes and or numbers of the religions (active or not) should not be limiting and can be varied. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A semiconductor circuit for driving a load, comprising:
    a transformerless Alternative Current (AC) to Direct Current (DC) converter integrated circuit, including:
    a high voltage circuit fabricated on a substrate for converting a high voltage AC input signal to a first high voltage DC output signal;
    a second circuit fabricated on the substrate for regulating a drive signal for driving a load using power from the first high voltage output signal;
    the second circuit includes:
    a linear regulator coupled with the first high voltage Direct Current (DC) output signal output from the high voltage circuit for providing a first low voltage signal for an externally coupled device, with the externally coupled device providing a second low voltage signal to the second circuit;
    a reference voltage module coupled with the linear regulator for providing a reference voltage from which the first low voltage signal is determined;
    a current level control for activating a current regulator for a time;
    the current regulator outputs a predetermined amount of regulated output current within the time;
    a thermal protection for determining a temperature of the current regulator and shutting off the current regulator if the temperature exceeds a predetermined threshold level; and
    a power protection module for shutting off the current regulator if regulated output current exceeds a predetermined threshold level;
    the high voltage circuit and the second circuit are fabricated on the substrate forming a single integrated circuit (IC) chip.

2. The semiconductor circuit for driving a load as set forth in claim 1, wherein:
    the high voltage circuit is comprised of a bridge rectifier and the second circuit is comprised of a regulator circuit.

3. The semiconductor circuit for driving a load as set forth in claim 2, wherein:

the bridge rectifier is comprised of a high voltage bridge rectifier, including:
one or more semiconductor rectifiers that are coupled in series, with one or more series coupled semiconductor rectifiers coupled in bridge circuit topography to provide a maximum reverse-bias potential that is greater than the high voltage Alternative Current (AC) input signal.

4. The semiconductor circuit for driving a load as set forth in claim 3, wherein:
the one or more semiconductor rectifiers are coupled in parallel with a semiconductor transistor switch enabling a bypassing of the one or more semiconductor rectifiers to save power.

5. The semiconductor circuit for driving a load as set forth in claim 4, wherein:
the semiconductor transistor switch is a silicon controlled rectifier.

6. The semiconductor circuit for driving a load as set forth in claim 2, wherein:
the first high voltage Direct Current (DC) output signal is coupled with at least one semiconductor rectifier, with another end of the at least one semiconductor rectifier coupled with ground, providing a trench bias.

7. The semiconductor circuit for driving a load as set forth in claim 3, wherein:
the semiconductor rectifiers are comprised of semiconductor devices coupled to function as rectifiers.

8. The semiconductor circuit for driving a load as set forth in claim 3, wherein:
the semiconductor rectifiers are comprised of diodes.

9. The semiconductor circuit for driving a load as set forth in claim 1, wherein:
the externally coupled device is a capacitor and is charged by the first low voltage signal.

10. The semiconductor circuit for driving a load as set forth in claim 1, wherein:
the linear regulator includes:
an operational amplifier with a first operational amplifier input coupled with the reference voltage, and a second operational amplifier input coupled with the first high voltage Direct Current (DC) output signal through a set of resistors, with the operational amplifier driving a shunt transistor for maintaining and providing the first low voltage signal to the externally coupled device.

11. The semiconductor circuit for driving a load as set forth in claim 1, wherein:
the reference voltage is generated through bandgap reference of a transistor.

12. The semiconductor circuit for driving a load as set forth in claim 1, wherein:
the current level control is driven by a pulse width modulator (PWM), and outputs a drive signal that activates the current regulator for the time, which is commensurately determined by the duty cycle of the pulse width modulation;
the amount of regulated output current output by the current regulator within the time is determined by a predetermined input current set $I_{SET}$ and the voltage reference $V_{REF}$.

13. The semiconductor circuit for driving a load as set forth in claim 1, wherein:
the thermal protection is provided by temperature-compensated bias reference.

14. The semiconductor circuit for driving a load as set forth in claim 1, wherein:
the power protection module detects the amount of power by detecting the regulated output current output from the current regulator and the amount of voltage across the load.

15. The semiconductor circuit for driving a load as set forth in claim 1, wherein:
the load is comprised of one or more Light Emitter diodes.

16. A semiconductor circuit for driving a load, comprising:
a transformerless Alternative Current (AC) to Direct Current (DC) converter integrated circuit, including:
a high voltage circuit fabricated on a substrate for converting a high voltage AC input signal to a first high voltage DC output signal;
a second circuit fabricated on the substrate for regulating a drive signal for driving a load using power from the first high voltage output signal;
the high voltage circuit and the second circuit are fabricated on the substrate forming a single integrated circuit (IC) chip;
the substrate is comprised of a patterned substrate-on-insulator pattern, insulating the high voltage circuit from that of the second circuit, with both on the same substrate;
the patterned substrate-on-insulator topography includes:
an insulator layer for insulating a device substrate from a base substrate;
the insulator layer further including vertically oriented trenches, normal to the device substrate, separating and insulating the device substrate into isolated device substrate regions;
one or more isolated device substrate regions include the first high voltage circuit that is comprised of a bridge rectifier and the second circuit that is comprised of the regulator circuit.

17. The semiconductor circuit for driving a load as set forth in claim 16, wherein:
each isolated device substrate region of the one or more isolated device substrate regions includes one or more semiconductor devices, with a plurality of isolated device substrate regions and the one or more semiconductor devices within each isolated device substrate region forming the single transformerless AC to DC converter integrated circuit (IC) chip.

18. The semiconductor circuit for driving a load as set forth in claim 16, wherein:
insulator layer is a buried oxide layer.

* * * * *